July 1, 1969  B. HAMBLETON  3,452,958

CARGO PALLET RAIL ASSEMBLY

Filed Dec. 29, 1967

INVENTOR.
BRIAN HAMBLETON
BY
Christensen, Sanborn, & Matthews
ATTORNEYS

United States Patent Office 3,452,958
Patented July 1, 1969

3,452,958
CARGO PALLET RAIL ASSEMBLY
Brian Hambleton, Bellevue, Wash., assignor to Heath Tecna Corporation, Kent, Wash., a corporation of Washington.
Filed Dec. 29, 1967, Ser. No. 694,716
Int. Cl. B65d 19/38
U.S. Cl. 248—346                 5 Claims

ABSTRACT OF THE DISCLOSURE

The framing rail for a cargo-carrying pallet is formed from metal or similar strong material and includes apertures through its major surfaces which are parallel to the plane of the pallet. The anchoring elements for cargo straps are inserted into and locked in position in the apertures in the upper major surface of the rail and foreign material such as ice, snow, sand, dirt and water is easily drained or removed from the rail through slots formed in the panel material adjacent to the rail apertures and through the apertures formed in the lower major surface of the rail. The thicker upper section of the rail provides adequate strength to hold the anchoring elements without need for rail inserts and their fasteners. The side edges of the pallet slots are sealed to prevent deterioration.

BACKGROUND OF THE INVENTION

Field of the invention

This invention relates to cargo-carrying pallets and particularly to an improved rail for framing the pallets and for supporting anchoring elements used to secure the cargo to the pallet.

Description of the prior art

Cargo carriers, such as airplanes, often carry cargo which has first been loaded onto large flat pallets. These pallets are then conveyed over rollers into the cargo carrier and fastened to prevent relative movement between the cargo and the inside walls of the carrier. In some systems lightweight cargo-forming huts are supported by and fastened to the pallets to house the cargo and to prevent it from damaging the inside of the carrier. Cargo-holding straps are secured to anchoring elements which are detachably secured to fittings on the edges of the pallet. Several examples of typical cargo-forming huts are disclosed in the United States Patent No. 3,294,034 to Bodenheimer et al.

One commonly used device for securing the strap-anchoring elements is a track such as that disclosed in United States Patent No. 3,212,457 to Looker. Short lengths of such tracks are commonly used as inserts in the edge bordering rail of a cargo-supporting pallet. Such inserts require handling and installation time before they are in place. Further, since the pallets are often stored near open warehouse doors or even in unprotected areas prior to further handling, they are subjected to rain, snow, dirt, and other foreign material. This material often finds its way into the tracks and causes the apertures for the anchoring elements to become clogged. Cleaning and drying out the tracks is time consuming and wastefully expensive.

It is therefore the principal object of this invention to provide an improved cargo pallet assembly which is cheaply and quickly manufactured to provide securing positions for strap-anchoring elements without the need for track inserts.

It is another object of the instant invention to provide an improved pallet rail assembly which is easily cleaned and drained, particularly in the portions thereof used to support anchoring elements.

It is a related object of the instant invention to provide an improved cargo pallet assembly wherein the pallet material adjacent to the strap-anchoring element apertures is protected from the deleterious effects of ice, snow, rain and dirt, and other foreign materials.

SUMMARY OF THE INVENTION

In accordance with the present invention, the pallet framing rail of a load-carrying pallet defines apertures in which cargo-anchoring means are detachably secured. The pallet material below the apertures defines a slot communicating with the apertures in the rail so that any foreign material such as water, snow, ice or dirt can be easily cleared from the anchoring apertures. In the general case wherein the rail embraces both major surfaces of the edge of the pallet, apertures are also defined in the lower major surface of the rail to permit easy drainage and self-cleaning of the anchoring apertures. The side edges of the pallet exposed by the slot are coated with a protective material such as polyurethane to resist deterioration of the pallet material.

These and other features and advantages of the invention will become more clearly apparent from the following detailed description thereof, which is to be read with reference to the accompanying drawings.

BRIEF DECRIPTION OF THE DRAWINGS

DESCRIPTION OF THE PREFERRED EMBODIMENT

In general, this invention concerns an improved pallet framing rail which in a unitary form not only serves its general functions of reinforcing the side edges of the pallet material and providing locations for cargo strap-anchoring elements, but also defines within it the very apertures used to secure the cargo-anchoring elements in place without the need of additional track inserts for such purpose. In addition, the apertures formed for supporting the anchoring elements are extended through the pallet material down through the lower portion of the framing rail to provide easy drainage of the apertures eliminating the clogging problem characteristic of prior known anchoring tracks.

Figure 1:
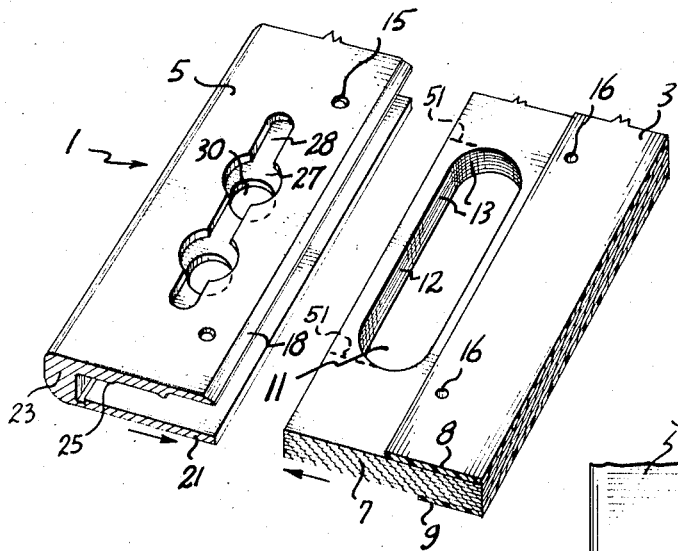
FIGURE 1 is an exploded partial isometric drawing illustrating the improved pallet framing rail as it is positioned to be inserted about the edge of the pallet in accordance with the present invention.
Figure 2:
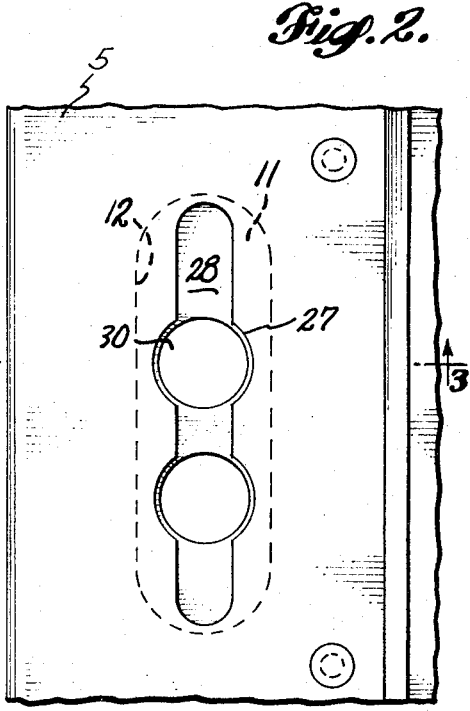
FIGURE 2 is a top plan view of a portion of an improved pallet assembly made in accordance with the present invention.
Figure 3:
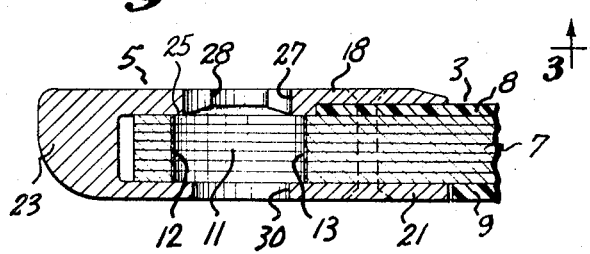
FIGURE 3 is a cross-sectional view as seen through lines 3—3 of FIGURE 2.

For a clearer understanding of how these objectives are obtained, reference is now directed to FIGURES 1–3 for a description of one preferred form of the pallet rail assembly. As shown, improved rail assembly 1 includes a pallet panel 3 which is inserted into and embraced by the rail 5. Panel 3 can be composed of any force-transmitting durable material and is generally in the form of a plywood panel 7 having a resin impregnated or other durable coating layer 8 and 9 applied to its major surfaces for durability. The panel 7 has defined in its extreme side edges, in locations where anchoring elements will be located, a slot 11 which exposes side edges 12 of the panel material. To increase the durability and the resistance of the panel material to rot and other damage due to moisture and dirt, the side edges 12 can be coated with a film 13 of protective material such as polyurethane. Rail 5 is secured to the panel 3 by means of bolts or rivets (not shown) which are inserted through the apertures 15 in the rail 5 into holes 16 in the panel 3.

The rail 5 is generally formed from extruded aluminum such as aluminum alloys designated 6061 to 7075–T6. As shown, rail 5 includes an upper member 18 generally coplanar with the upper coating 8 of the pallet 3 and lower member 21 generally coplanar with the lower coated surface 9 of the pallet 3. The ends of lower members 18 and 21 are joined at the edge perimeter 23 of the rail 5. It should be noted that the upper member 18 includes a reinforced thickness area 25 for providing adequate strength for holding the anchoring elements (not shown) which are inserted through the apertures 27 and slots 28 defined in the upper member 18. With this construction, it is possible to use the anchoring elements such as disclosed in the previously mentioned Looker Patent No. 3,212,457 which can be firmly and securely held within the apertures 27 and 28 defined in the upper member 18 of the rail 5. As shown, additional apertures 30 may be formed in the lower member 21 in general registry with the apertures 27 formed in the upper member 18 to permit easy drainage of the slot area 11. These apertures 30 also provide easy exits for dirt, dust, and other foreign matter which may collect in the slot area 11. For those pallets with an edge rail only on one major surface, such as shown in FIGURE 13A of the previously-mentioned Bodenheimer et al. patent, there is no need for a lower member and the dirt can freely exit through an appropriate slot in the edge of the panel in registry with the aperture formed in the upper member.

Figure 4:
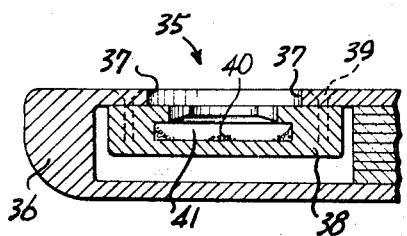
FIGURE 4 is a partial cross-sectional view illustrating a prior art panel assembly installation utilizing a rail insert.
Figure 5:
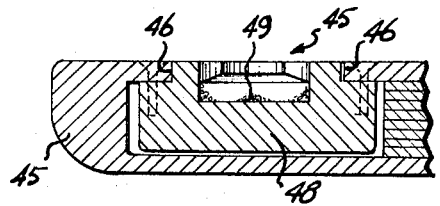
FIGURE 5 is a partial cross-sectional view of a panel assembly illustarating another form of the prior art.

In order that the significance and advantages of the instant invention may be more fully appreciated, reference is now directed to the prior art form of rail assemblies for anchoring cargo straps as shown in FIGURES 4 and 5. One prior art embodiment 35 shown in FIGURE 4 includes a rail 36 which has defined in it a longitudinal slot 37 permitting access for the anchoring elements (not shown) to the anchoring track 38 which is inserted into the rail 36 and held in place by appropriate fasteners 39.

The track 38 is substantially identical to that shown in FIGURE 5 of the previously referred to Looker Patent 3,212,457. As shown in FIGURE 4, dirt and other debris 40 can easily accumulate along with ice and other material in the closed bottom area 41 of the track 38 to clog and otherwise interfere with the easy operation of the anchoring device.

In a similar manner the second prior art assembly 45 shown in FIGURE 5 includes a conventional rail 45 which has defined within it a longitudinal slot 46 for insertion therein of a large anchoring track 48 which also accumulates dirt 49 and has all the disadvantages of the embodiment 35 shown in FIGURE 4.

Bearing in mind that the foregoing description is merely one of many forms that the improved cargo pallet assembly may take, those skilled in the art with the benefit of this disclosure should be able to make several modifications to produce equivalent structures and results. For example, the cleaning aperture established by slot 11 in the side edges of the panel 7 could be modified to provide a simple cut out notched cleaning aperture by cutting along lines 51 shown in FIGURE 1.

Thus, it is seen that the improved pallet rail assembly of the instant invention provides the unitary structural form which eliminates the need for additional inserted parts and assembly time and also by providing top to bottom extending apertures permits easy cleaning of the anchoring apertures.

What is claimed is:
1. A cargo pallet assembly comprising:
a pallet member including side edges,
a pallet edge framing rail including an upper member overlying and fastened to an edge portion of the upper major surface of said pallet member,
said upper member providing anchoring apertures therein for holding cargo-anchoring elements,
said anchoring apertures including larger apertures with narrower slots extending therebetween, and
said pallet member providing a cleaning aperture having a width at least wider than said narrow slots and extending through the thickness of said pallet edge in general registry with said anchoring apertures for permitting dirt and other material entering through said anchoring apertures to easily pass through said pallet cleaning aperture.
2. The assembly of claim 1, wherein:
said rail also includes a lower member spaced from and generally parallel to said upper member and fastened to an edge portion of the lower major surface of said pallet member,
said lower member providing drain apertures therein in general registry with said anchoring apertures and said cleaning aperture for permitting easy drainage of water and other material through said drain apertures.
3. The assembly of claim 1 wherein:
the side walls of said cleaning aperture which are exposed by said anchoring apertures are coated with polyurethane.
4. An air cargo pallet rail assembly comprising:
a pallet framing rail assembly formed to extend around and attach to a load-carrying pallet to embrace the side edges of said pallet,
said rail including generally parallel upper and lower members joined along one of their edges at an edge perimeter with said upper member spaced away from said lower member a distance substantially equal to the thickness of said pallet edge,
said rail members providing apertures through the thicknesses thereof and in general registry with one another to provide support for cargo-anchoring elements in said upper member and easy removal of foreign material through said lower member, and
said apertures in said upper member including larger apertures with narrower slots extending therebetween.
5. The assembly of claim 4 wherein said upper rail member is thicker than said lower member.

References Cited

UNITED STATES PATENTS

| | | | |
|---|---|---|---|
| 1,944,845 | 1/1934 | Rickwood | 108—55 |
| 2,794,611 | 6/1957 | Sjoblom et al. | 108—51 |
| 3,298,327 | 1/1967 | Grimes | 108—57 |

CHANCELLOR E. HARRIS, *Primary Examiner.*

J. PETO, *Assistant Examiner.*

U.S. Cl. X.R.

108—55; 248—361